Sept. 9, 1969　　　J. C. WILLIS ET AL　　　3,465,383
PROCESS AND APPARATUS OF FEEDING SHRIMP TO DESHELLING
MEANS AND OF DESHELLING SHRIMP
Filed Dec. 9, 1968　　　　　　　　　　　　　　　　　4 Sheets-Sheet 1

INVENTORS:
JOHN C. WILLIS
ODD B. SUNDBERG
BY
Clinton L. Mathias
ATTORNEY

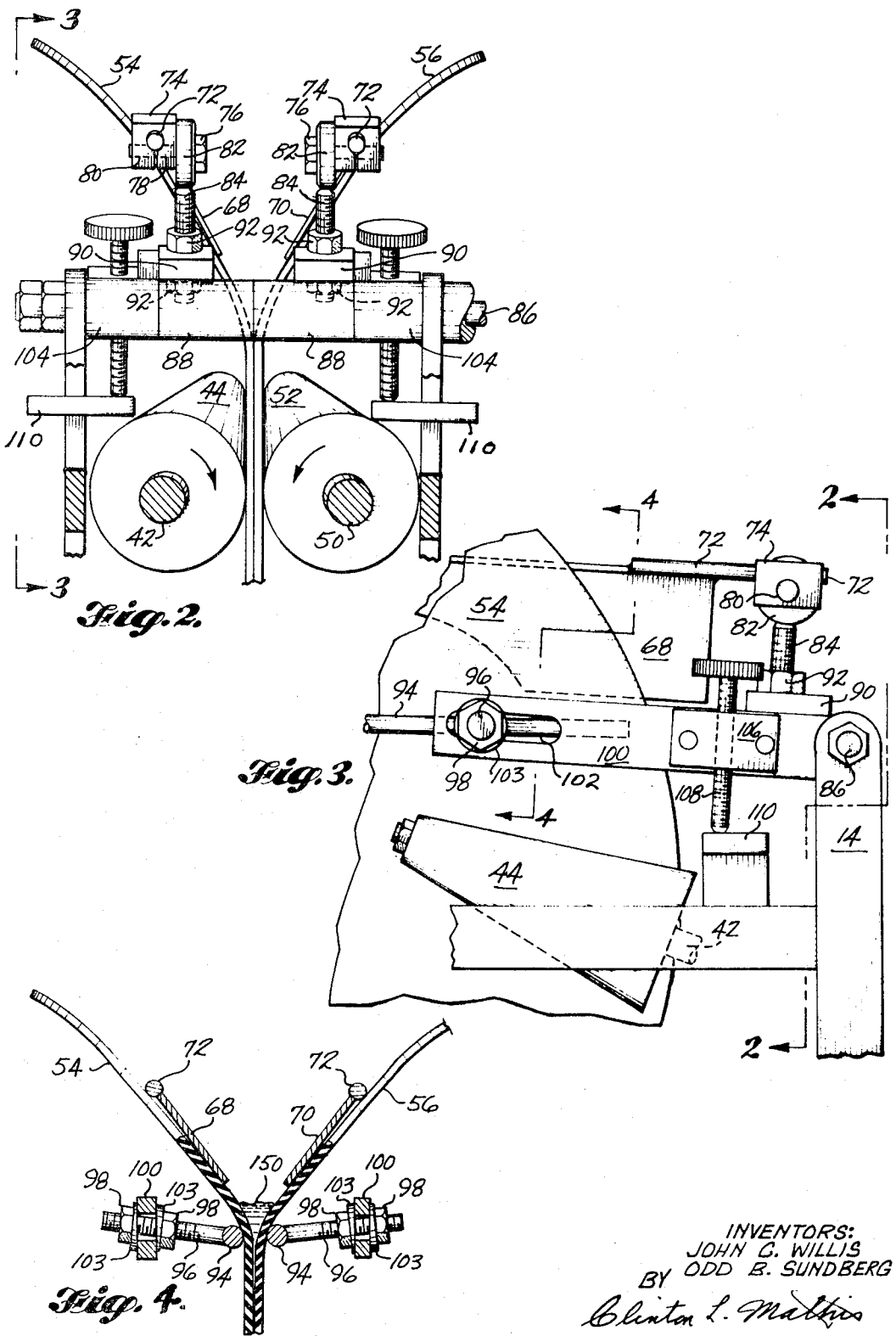

INVENTORS:
JOHN C. WILLIS
BY ODD B. SUNDBERG

ATTORNEY

Sept. 9, 1969　　　　　J. C. WILLIS ET AL　　　　　3,465,383
PROCESS AND APPARATUS OF FEEDING SHRIMP TO DESHELLING
MEANS AND OF DESHELLING SHRIMP
Filed Dec. 9, 1968　　　　　　　　　　　　　　　　4 Sheets-Sheet 4

INVENTORS:
JOHN C. WILLIS
BY ODD B. SUNDBERG

ATTORNEY

United States Patent Office 3,465,383
Patented Sept. 9, 1969

3,465,383
PROCESS AND APPARATUS OF FEEDING SHRIMP TO DESHELLING MEANS AND OF DESHELLING SHRIMP
John C. Willis and Odd B. Sundberg, Juneau, Alaska, assignors to Alaska Peelers, Inc., Seattle, Wash., a corporation of Washington
Continuation-in-part of application Ser. No. 626,848, Mar. 29, 1967. This application Dec. 9, 1968, Ser. No. 782,051
Int. Cl. A22c 29/00
U.S. Cl. 17—73                                     10 Claims

ABSTRACT OF THE DISCLOSURE

This invention relates to apparatus and method of deshelling cooked shrimp and includes adjustable shrimp-deshelling rotary rubberlike discs; adjustable means to control a deshelling throat between such discs; means to provide water to such throat; and shrimp-feeding means to cause shrimp to travel to such deshelling throat with the shrimp oriented in the same position, as traveling on their backsides and with their heads trailing. The invention further comprises the use of air directed at substantially an acute angle to shrimp traveling by gravity down an inclined chute and thus orienting the shrimp as indicated. The invention further comprises first mechanically engaging the shrimp shell at the head portion of the shrimp and then at the tail portion of the shrimp and thus causing the shrimp meat to be ejected from the shrimp shell.

---

Our invention relates to the method of peeling or shelling cooked or boiled shrimp, the feeding of shrimp to mechanical deshelling means, and means for deshelling shrimp.

This application is a continuation-in-part of our copending application Ser. No. 626,848, filed Mar. 29, 1967.

In said copending application, we disclosed, inter alia, and in general, two rotary driven, adjacent and substantially vertically disposed, flexible shrimp-deshelling disc members in combination with spaced apart stationary bars positioned to contact lateral outer surface portions of said discs to position the lateral inner surfaces of the discs in contact to form a shrimp-deshelling throat. However, we did not disclose and teach desirable adjustable mounting assemblies for such structures.

Also, in said prior application, we did not teach a process and apparatus for feeding shrimp to such deshelling apparatus so that during travel, the shrimp were oriented in a given direction, such as with the shrimp traveling on their backsides and with their heads trailing.

Objects of this invention are to provide a process and apparatus to cause cooked shrimp to travel down a chute to a mechanical shrimp-deshelling device and where the shrimp during their travel are oriented so that they present first to said shrimp-deshelling devices certain portions of the bodies of said shrimp.

More particularly, it is an object of this invention to cause said shrimp to travel to a mechanical shrimp-deshelling device and with the shrimp traveling with the heads trailing. Another specific object is to cause said shrimp to travel on their backsides.

Another object is to cause shrimp to travel under the force of gravity down a delivery chute and to impinge air under pressure at an angle to said traveling shrimp, preferably at an acute angle, to cause said traveling shrimp to assume a body position while traveling with the heads trailing and preferably with the shrimp traveling on their backsides.

Another object of our invention is to provide a process and apparatus therefor where shrimp are caused to travel to a mechanical shrimp-deshelling means which will first engage head portions of the shrimp to be deshelled, angularly move the shrimp to next engage the tail portion of the shrimp by said mechanical means, and thus cause the shrimp meat to be expelled from the shrimp shell.

Another object of our invention is to cause shrimp to be deshelled by rotary rubberlike discs in the presence of water to maintain good mechanical engagement of the shrimp-shelling means with the shrimp shell and with limited mechanical engagement with the shrimp meat.

Another object is to provide two relatively driven, adjustable and substantially vertically disposed, flexible shrimp-deshelling disc members which function best to deshell shrimp when shrimp are presented thereto with the head portions trailing and this in combination with process and apparatus to cause shrimp to be fed to said disc members with the shrimp traveling with their heads trailing.

Other objects of our invention will become inherent and implicit as the description of our invention proceeds in connection with the drawings, wherein like reference numerals refer to like parts and wherein:

FIG. 2 is a detached fragmentary view showing particularly the means providing a shrimp deshelling throat between the two driven shrimp-deshelling discs and taken substantially on broken line 2—2 of FIG. 3;

FIG. 3 is a fragmentary view taken substantially on broken line 3—3 of FIG. 2;

FIG. 4 is a fragmentary detached view taken substantially on broken line 4—4 of FIG. 3;

Figure 1:
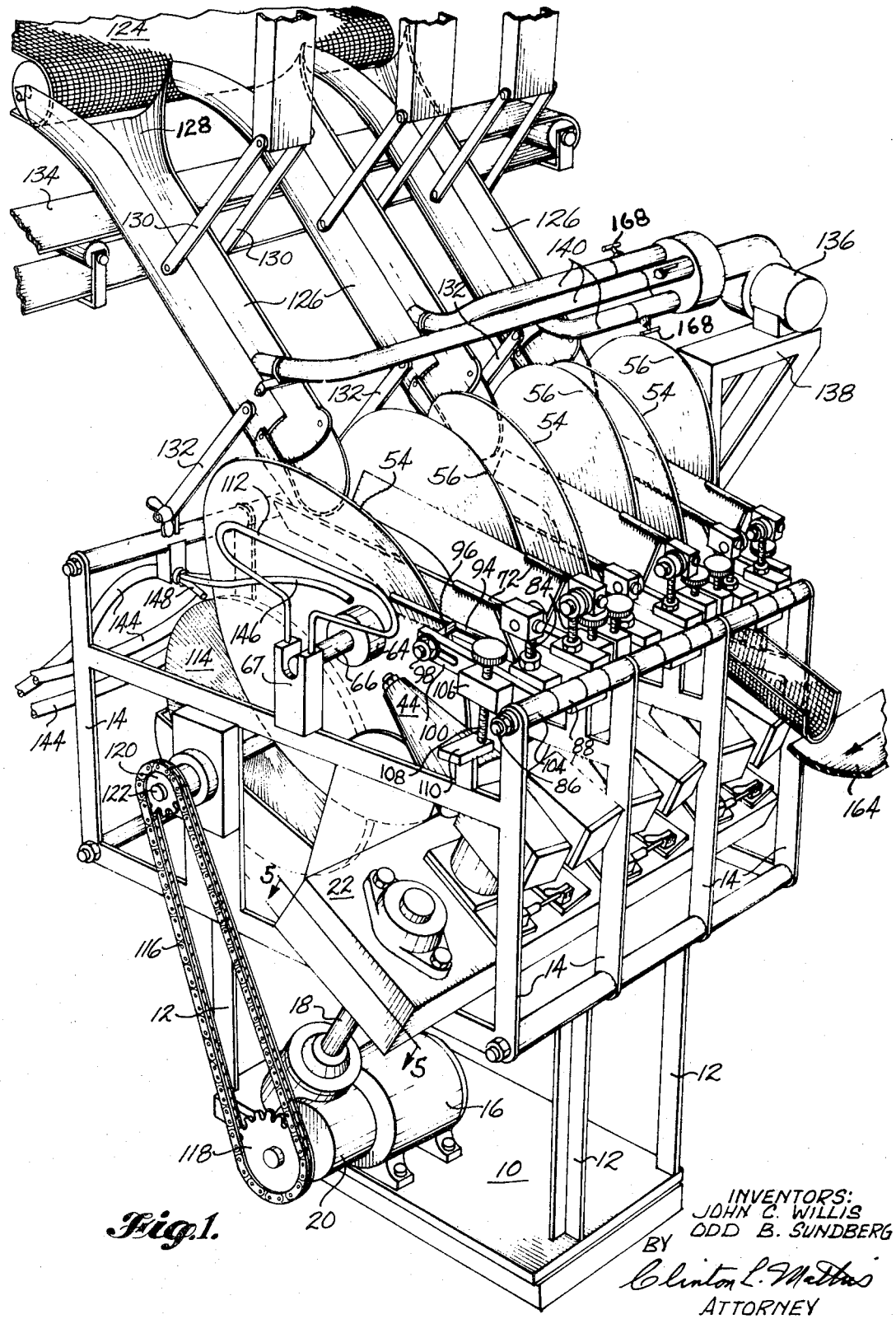
FIGURE 1 is a perspective fragmentary view of a device embodying our invention.
Figure 5:
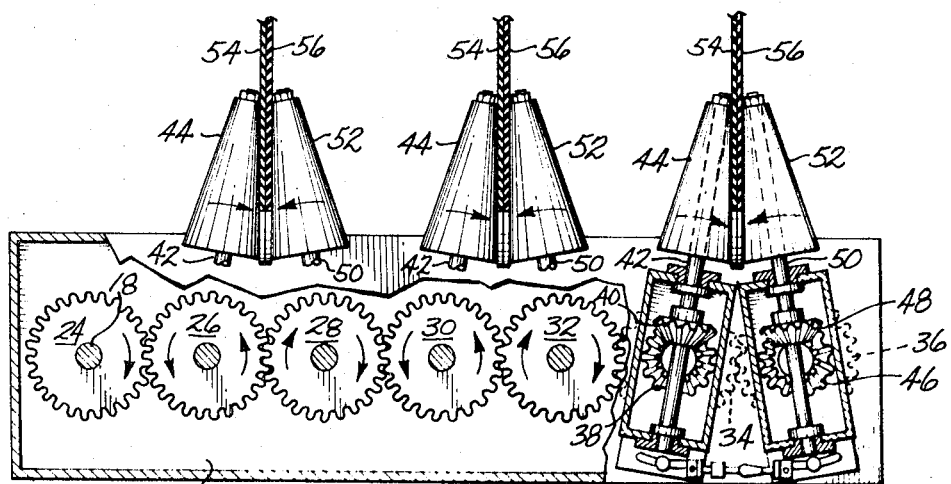
FIG. 5 is a fragmentary view taken substantially on broken line 5—5 of FIG. 1.
Figure 6:
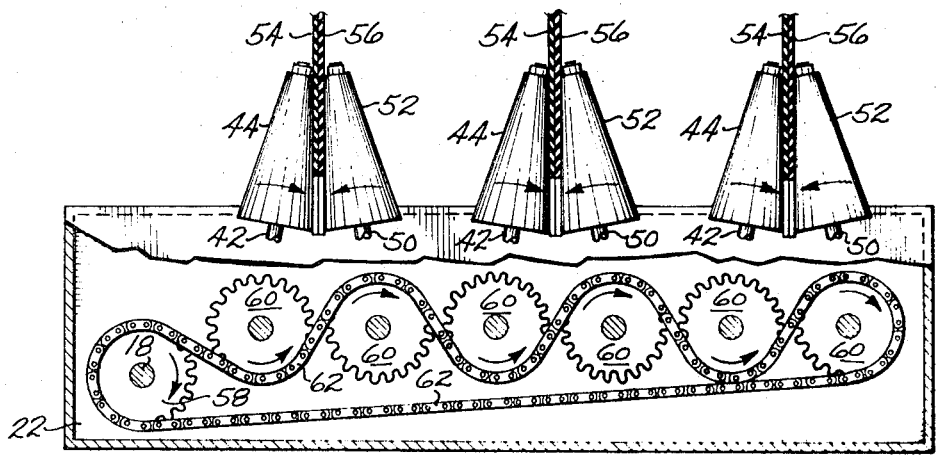
FIG. 6 is a view similar to FIG. 5 of a modified form of our invention.

Referring to FIG. 1 of the drawings, a base plate 10 is suitably supported and at a desired elevation. Such base plate 10 in turn mounts and supports other structure of this invention. Structural frame members 12 are supported by base plate 10 and in turn support additional structural frame members 14. A suitable source of rotary power, as electric motor 16, is provided. Electric motor 16 drives shaft 18 (see also shaft 18 to the left in FIGS. 5 and 6) and this may be accomplished through the use of a gear box 20 shown in FIG. 1. Housing 22 mounts therein gears 24, 26, 28, 30, 32, 34 and 36. Gear 24 is mounted on and is driven by shaft 18, and in the form shown in FIG. 5, the gears 24, 26, 28, 30, 32 34 and 36 intermesh so that the gear 24 turns in one direction, such as clockwise as indicated in FIG. 5, the next gear 26 turns in a counterclockwise direction, the next gear 28 turns in a clockwise direction, etc. Thus, gear 34 will turn in a counterclockwise direction and its meshed gear 36 will turn in a clockwise direction.

Gear 34 drives one of the miter gears 38, 40 and through such miter gears drives shaft 42 which in turn drives cone 44 in one direction such as clockwise as viewed in FIG. 5. At the same time gear 36 drives one of miter gears 46, 48 which in turn drives shaft 50 and cone 52, with cone 52 driving in opposite direction than cone 44. Between cones 44 and 52 are positioned, rotatably mounted, shrimp-peeling discs 54 and 56 and said cones drive said discs in a rotary direction.

In commercial use embodying this invention, there will be a plurality of pairs or sets of shrimp-peeling discs 54, 56, such as eight, and as an illustration thereof in FIGS. 1, 4 and 5, I have illustrated a plurality, such as three sets or pairs. The gears 26, 28 and the gears 30, 32, each drive a pair of cones 44, 52 and a pair of shrimp-peeling discs 54 and 56 similar to those driven by 34, 36.

As an alternative construction for the meshing gears of FIG. 5, the housing 22 (in FIG. 6) may mount a sprocket 58 on shaft 18. As the same housing 22 is shown, sprocket 58 is slightly smaller than gear 24 and a plurality of spaced apart sprockets 60 (of the same size as sprocket 58) may be employed for meshing gears 26, 28, 30, 32, 34 and 36 and with a link-chain belt 62 reeved about said sprockets 60 as shown, so that adjacent sprockets turn in opposite directions to each other and to obtain the same results as obtains in connection with the structure of FIG. 5. Each pair of sprockets 60, rotating in opposite directions, rotates shafts 42, 50, cones 44, 52, and shrimp-peeling discs 54, 56 in the manner described in connection with FIG. 5.

Now, returning to FIG. 1 of the drawings, each pair of shrimp-peeling discs 54, 56 is carried by hub or bearing means 64 on a fixed stub shaft 66. A pair of spaced apart bearing supports 67 (only one of a pair being shown in FIG. 1) will rotatively support the ends of a stub shaft 66. The bearings 67 are U-shaped so that each stub shaft 66 and the shrimp-peeling discs 54, 56 supported thereby as well as the hub or bearing 64 may be removed as a unit. As previously indicated, two shrimp-peeling discs 54, 56 are driven by frictional contact between two driven cones 44, 52 and not through the shaft 66 which supports the said shrimp-peeling discs 54, 56. This provides for the desired stretch of the rubber of shrimp-peeling discs 54, 56 at the shrimp-peeling area.

The shrimp-peeling discs 54, 56 are natural rubber or a synthetic rubber or an elastomer or a combination thereof having the stretch characteristics of natural rubber. This provides for the desired frictional contact between the driving cones 44, 52 and the said shrimp-peeling discs 54, 56 and also permits the stretch characteristics of the shrimp-peeling discs 54, 56 which aid in the shrimp-peeling operation.

The discs of each pair of shrimp-peeling discs 54, 56 are held apart at their upper portions by internal side guides 68 and 70 to provide a passageway for the reception of shrimp between said discs 54, 56. Each of the side guides 68, 70 terminates in a rod 72 (see also FIG. 2). A mounting means for each of said rods 72 and in turn for selectively positioning a side guide 68 or 70 comprises a split coupling 74 having an opening therein to receive a rod 72. The shank of bolt 76 passes through a nonthreaded bore 78 of the coupling 74 and threadedly engages the threaded portion 80 of the coupling 74. Thus, the bolt 76 may be tightened against the threaded portion 80 and this will snugly and firmly hold the rod 70 in the bore in the coupling 74. Also, upon tightening of bolt 76 against said threaded portion 80, the coupling 74 will be held relatively rigidly against the supporting face 82 of the bolt means 84. A cross shaft 86 is parallel to stub shafts 66 and pivotally supports bearings 88. Tongues 90 are carried by bearings 88 and in turn tongues 90 support bolt means 84. Nuts 92 are threaded onto bolt means 84 and disposed above and below each tongue 90 and thus the vertical elevation of the coupling 74 and a rod 72 carried thereby may be adjusted which in turn will provide for vertical adjustment of an internal side guide 68 or 70. Also, the angular movement of a rod 72 about its axis and a side guide 68 or 70 carried thereby may be readily adjusted by loosening of the bolt 76 and turning the rod 72 and side guide carried thereby about the longitudinal axis of the rod 72. Also, a side guide 68 or 70 may be angularly raised or lowered about an axis of the bolt 76 by loosening the bolt and then turning the coupling 74 about the axis of bolt 76 and then the bolt 76 tightened to maintain any desired adjustment obtained. Thus, each side guide 68, 70 is provided with a relatively universal support on its tongue 90.

In order to obtain a desired adjusted force urging two shrimp-peeling discs together, we provide outside adjustable rod means 94 (see also FIG. 4) on the outsides of two adjacent shrimp-peeling discs 54, 56. In other words, there is a rod portion 94 on the outside of each of two adjacent shrimp-peeling discs 54, 56, each rod 94 engages with such a disc at the desired adjustable angle and the rods 94 urge the discs 54, 56 against each other. Each of the guide rods 94 is connected with a rod portion 96 at right angles thereto, so that said rod portions 94, 96 form substantially a T-shaped member. The rod portion 96 connects through a threaded nut 98 with a lever 100 (see FIGS. 1, 3 and 4) having a slotted portion 102 therein. Thus, by loosening of a nut 98 and adjusting of a rod 96 relative to a slot 102, adjusted positions of a guide rod 94 may be obtained radially of the shrimp-peeling discs 54, 56. Also, by reason of the slot 102 and nuts 98, a rod 94 may be angularly moved relative to a lever 100. Also, by the use of appropriate curved washers 103 between nuts 98 and the lever 100, the lever 100 may be angularly moved as respects the longitudinal axis of the rod 96 and then after a desired angular position is obtained, the nuts 98 may be tightened. The foregoing sets forth one way of providing substantially relatively universal motion between a lever 100 and a guide rod 94. In other words, each guide rod 94 is provided with a relatively universal connection to its supporting lever 94. The levers 100 are pivotally connected and supported by the cross shaft 86 by bearings 104 (see FIGS. 1 and 2). In order to provide an adjusted amount that each bearing 104 will turn, a block 106 is provided carrying a set screw 108 and the set screw 108 may be adjusted until the same rests against and is stopped by stop plate 110 carried by the frame members 14.

Thus, the side guides 68 and 70 of each unit are pivotally supported by the cross shaft 86 and also the guide rods 94 (operating externally of the shrimp-peeling discs 54, 56) are pivotally supported on said cross shaft 86. Preferably, a projection 111 (FIG. 2) carried by each tongue 90 extends sidewise so that whenever one of the external rod portions 94 is raised, this will cause the raising of the adjacent internal side guide 68, 70. On the other hand, one of the internal side guides 68, 70 can be raised without raising an external rod portion 94.

The outside shrimp-peeling discs 54, 56 on the end pair of each set is supported by a guide support 112 shown in FIG. 1 of the drawings to the middle left.

Figure 7:
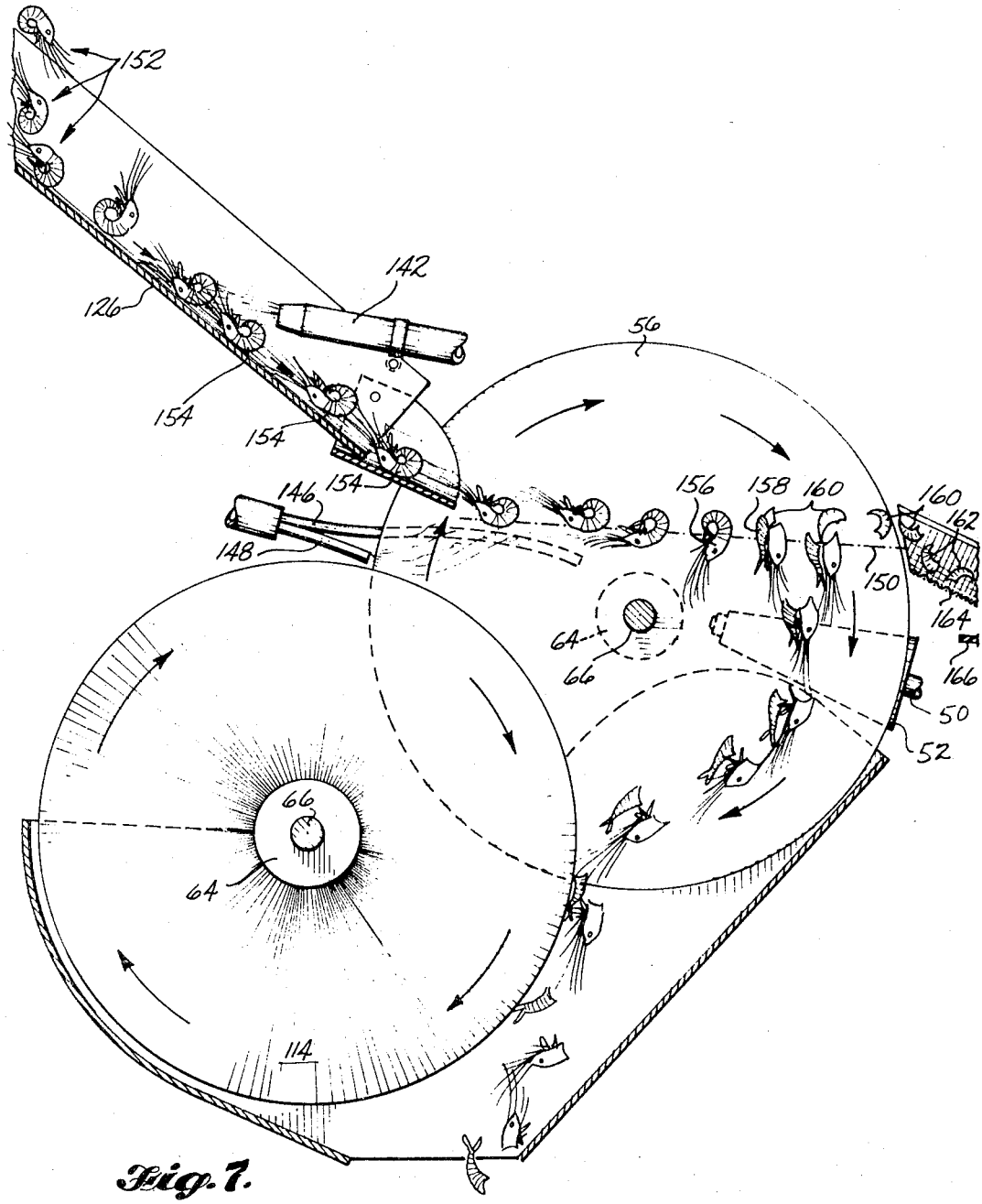
FIG. 7 is a somewhat schematic view illustrating the process of deshelling shrimp of our invention and apparatus therefor.

Between each of a pair of shrimp-peeling discs 54, 56 is operated a rotary brush 114 (FIGS. 1 and 7). The said brush 114 is driven in a direction shown by the arrows in FIG. 7 of the drawing so that the direction is counter to the rotation of the shrimp-peeling discs 54, 56. The said rotary brushes 114 may be driven by the same electric motor 16 by using a driving link chain 116 reeved over sprockets 118 and 120 carried respectively by the driven shaft of motor 16 and cross shaft 122. Cross shaft 122 mounts thereon a plurality of driven rotary brushes 114, one brush for use between each pair of shrimp-peeling discs 54, 56.

A way of conveying cooked shrimp to the shrimp peeler of this invention will include the use of a relatively wide conveyor belt 124 (see fragment thereof in FIG. 1). This belt may be endless and formed of a wire screen mesh so that shrimp will be supported thereby and moisture will drain through the belt. Also, the belt will be of a width to feed the various units of the shrimp peeler such as a commercial unit having eight sets or pairs of shrimp-peeling discs 54, 56. Shrimp will be initially spread relatively uniformly crosswise of the belt 124 and then a plurality of delivery chutes 126 are provided with funnel-shaped side guides 128 so that the shrimp on conveyor belt 124 will be divided into the number of units, as eight, of shrimp-peeling discs 54, 56. Preferably, each of the chutes 126 is pivotally supported by upper pivot arms 130 and lower pivot arms 132 so that an individual chute 126 can be pivoted out of alignment to receive shrimp being delivered from shrimp-conveyor belt 124 and when an individual chute 126 is out of the way, then shrimp which normally would have been delivered to such a chute will pass off the end of shrimp-conveyor belt 124 and onto crosswise shrimp-conveyor belt 134. Thus, if it is desired to interrupt the delivery of shrimp to any particular pair of shrimp-peeling discs 54, 56, the chute 126 to such particular pair of shrimp-peeling discs may be moved out of registration with shrimp discharging from shrimp-conveyor belt 124 and such shrimp will be delivered onto the crosswise shrimp-conveyor belt 134. This will allow an operator to make repairs, corrections, or adjustments, or the like and stop the shrimp feeding to any pair of shrimp-peeling discs 54, 56 without the stopping of shrimp feeding to the remaining shrimp-peeling discs 54, 56 of the shrimp-peeling machine.

A source of air under pressure is provided by blower 136 supported by structural members 138 (upper right, FIG. 1) and a discharge tube 140 is provided for each chute 126. Referring now to FIG. 7 of the drawings, each of the tubes 140 terminates in a nozzle portion 142 and the nozzle 142 presents an angle to the bottom of chute 126 which is an acute angle and preferably less than 45°. This provides air under pressure and with a substantial upward component against shrimp descending by gravity down a chute 126. The pressure is not sufficient to prevent the shrimp from sliding down the chute but is sufficient to cause the shrimp to orient themselves to a given direction during their descent down a chute 126. Each shrimp is subjected to the same forces: one of which, of course, is the force of gravity of the shrimp tending to slide down the chute and the other force is the force of the air against the surface of the shrimp. Due to the surface contour of the shrimp, the result is that substantially all shrimp will descend down a chute 126 with the shrimp sliding downward on their backs and with the head portion of the shrimp trailing, all as indicated in FIG. 7 of the drawings. By having the shrimp oriented to a particular manner of travel down the chutes, then there is shrimp which are all traveling in the same direction and thus substantially all of the shrimp are treated or subjected to the same treatment by the shrimp-peeling discs 54, 56. The feeding of shrimp in a uniform manner to the shrimp-peeling discs 54, 56 is an important feature of this invention as the same provides for uniform peeling of the shrimp and the elimination of most hand labor on shrimp peeled in accordance with this invention.

A source of water under pressure is connected to the various conduits 144 and connected with said conduits 144 are upper water conduits 146 and lower water conduits 148. Thus, a water level is maintained between two spaced apart portions of shrimp-peeling discs 54, 56 at a level above the juncture or where the two discs meet and to the level indicated by the broken line 150 in FIG. 4 of the drawings. The lower water conduit 148 provides water to aid the brushes 114 in removing shrimp shells, tails and heads, whereas, the upper water conduits 146 provide a water level as indicated at 150 in FIG. 4.

Referring now specifically to FIG. 7 of the drawing, shrimp 152 are delivered from conveyor belt 124 in random fashion so far as shrimp direction. In other words, some are advancing head first and some are advancing tail first and some are on their sides and some are on their backs and so forth. In other words, the pattern is entirely random. As such shrimp 152 pass under and are influenced by air exhausting from nozzles 142, the physical structure of the shrimp functionally cooperates with the action of air exhausting from a nozzle 142 so that substantially all shrimp travel on their backs, and with their head and whisker portions trailing. Due to the physical characteristics of the shrimp, the air blowing against the shrimp with a component traveling counter to the travel of the shrimp under the influence of gravity, causes the shrimp to orient themselves and take the positions during travel just described. This is an important part of our invention. Thus, shrimp passing the said nozzle 142 and which shrimp are numbered 154 are illustrated as traveling on their backs and with their heads and whiskers trailing.

Each pair of shrimp-peeling discs 54, 56 between which shrimp 154 are delivered, are separated to form a tunnel-like receiving opening by reason of the internal side guides 68, 70. Water is disposed between the said shrimp-peeling discs 54, 56 and preferably to the level indicated in FIG. 4 of the drawings.

A possible explanation as to why devices of our invention function is that where the shrimp-peeling discs 54 and 56 are in contact by reason of rods 94 (see also FIG. 4), the rubber discs at such area are relatively dry and when the head whiskers get into such nip between the rubber discs the whiskers are firmly engaged. Then the pull on the head whiskers causes the shrimp to turn and the tails are moved into the nip between the discs. This causes the tails to be firmly engaged. By pulling on the head whiskers and tails, the shrimp meat is, in effect, ejected from the shrimp shell and head parts and such meat tends to float on the water up to a given level, such as 150 shown in FIG. 4. Also, the meat, being in water and somewhat removed from the nip, is slippery and is not urged into the nip. This results in the shrimp meat being removed from the shell and not damaged in the process. Thus, as the shrimp are delivered to the area where they will be frictionally engaged by the rubber surfaces of the shrimp-peeling discs 54, 56, first the shrimp numbered 156 will have the head and whisker portions firmly engaged between shrimp-peeling discs 54, 56. This will cause the shrimp to turn until the shrimp numbered 158 will also have the tail portion engaged between two shrimp-peeling discs 54, 56 causing the shrimp to buckle and then the shrimp meat 160 will "pop out" and be released from the tail and head portions of the shrimp shell and thus shrimp meat numbered 162 will pass through discharge outlet 164 for each unit comprising shrimp-peeling discs 54, 56 and onto a common cross-conveyor belt 166 shown somewhat diagrammatically in FIG. 7 and a fragment of which is shown in connection with FIG. 1 of the drawings. The cross-conveyor belt 166 is provided for obvious purposes to provide a common collecting means for the shrimp meat discharging from the various discharge outlets 164 of the individual units comprising shrimp-peeling discs 54, 56.

In connection with the blower 136 and hose discharge outlets 140 and nozzle 142 there is shown in connection with FIG. 1 of the drawings control valves 168 so that individual adjustment is provided and each nozzle 142 may be adjusted as to the desired air pressure giving the best results.

From the foregoing it will now appear that shrimp 152 (see FIG. 7) may be delivered in a random fashion, random so far as the positioned direction of shrimp is concerned, to a delivery chute 126. A chute 126 is downwardly inclined to the horizontal so that shrimp will move downwardly thereon under the influence of the force of gravity. During such downward travel shrimp are subjected to the force of air under pressure from nozzle 142. The angle of said nozzle and of the flow of air emitting therefrom to the chute 126 is an acute angle of less than 45° and preferably is about 30°. The outer surface of each cooked shrimp shell is such that such shrimp under the two forces mentioned will be oriented to a position where substantially all shrimp will travel with the shrimp uniformly in the same direction and with the shrimp heads trailing and with the shrimp sliding on their backsides. By having the shrimp oriented to a given direction during travel, then mechanical shrimp-deshelling means can be combined therewith and thus such mechanical shrimp-deshelling means will operate with a greater degree of uniformity due to the fact that the shrimp is fed to the shrimp-deshelling means in a given direction of position of the shrimp.

Shrimp deshelling means comprising two rotary driven, adjustable and substantially vertically disposed flexible shrimp-deshelling discs provide one form of shrimp-deshelling means which operates at a maximum of uniformity and desirability when shrimp is fed to the same with the shrimp being positioned in a given direction of the shrimp. Thus, there is a novel feeding means for shrimp to a mechanical desheller and a combination effect between the novel feeding means and the particular mechanical shrimp desheller.

When shrimp, with their heads trailing are fed to the throat between two shrimp-peeling discs 54, 56 and where the said discs are urged together by rod means 94 to provide a nip at the bottom of the throat, the head portions, including the whiskers, of the shrimp 156 are mechanically engaged by the discs 54, 56. Water is present and preferably to the level 150 shown in FIG. 4, so the discs 54, 56 are very slippery except where their inner surfaces are in contact, thus excluding water, by reason of the action of the rod means 94 urging said surfaces in contact with each other. Thus, the whiskers and head portions of shrimp 156 in the said nip are firmly, mechanically engaged but other shrimp portions are not. This action of engaging and pulling on the head portions of shrimp 156 generally causes the shrimp to turn and to subject the tail portions of the shrimp, indicated by the shrimp 158 in said FIG. 7, to the mechanical gripping and pulling action of the discs 54, 56 and at the nip thereof. The combined action of said discs 54, 56 at the head and tail portions appears to eject the shrimp meat 160 from the shell portions and where water is present this shrimp meat is slippery and tends to float on the water and away from the nip between the discs 54, 56. The result is that shrimp is consistently recovered from the shell, is not damaged or bruised by the discs 54, 56 and is readily washed out of the throat between the discs 54, 56 and thus shrimp meat 162 is readily discharged by way of a discharge chute, as chute 164.

Water is delivered by conduits 146 to the shrimp-deshelling throat between discs 54, 56 and such water functions in the deshelling process as described. Also, water is delivered by conduits 148 to the discs 54, 56. However, the water from such conduits 148 is used primarily in a cleaning operation in combination with brush 114 to remove shrimp shells resulting from the deshelling operation.

Further, we have found that the rod means 94 should be mounted for universal movement so that the desired contact and pressure of the same against the outsides of the discs 54, 56 may be obtained.

Preferably the side guides 68 and 70 are also mounted for universal movement so that the shrimp-deshelling throat between discs 54, 56 may be suitably shaped.

Also, preferably mechanical deshelling action obtains by frictionally driving discs 54, 56 by cones 44, 52 engaging the outer surfaces of discs 54, 56 in close proximity to the shrimp-deshelling throat as is best shown in FIG. 2 of the drawings. Apparently having the discs 54, 56 under tension at the location of the nip therebetween provides a preferable mechanical shrimp-engaging and pulling action.

Obviously, changes may be made in the forms, dimensions, and arrangements of the parts of our invention without departing from the principle thereof, the above setting forth only preferred forms of embodiment of our invention.

We claim:
1. Apparatus for deshelling cooked shrimp comprising a downwardly inclined chute on which shrimp may be disposed in a random position pattern and will slide downwardly thereon under the influence of gravity; means directing air under pressure at an acute angle to said chute and to shrimp traveling downwardly thereon, said shrimp under said two forces assuming a direction of travel with the head portions trailing; and mechanical shrimp-deshelling means positioned in the path of travel of shrimp discharging from said downwardly inclined chute and engaging the head portions of descending shrimp.

2. The combination of claim 1, wherein said mechanical shrimp-deshelling means comprises two adjacent, substantially vertically disposed, flexible surface shrimp-contacting members mounted for arcuate movement about a center.

3. The combination of claim 1, wherein said mechanical shrimp-deshelling means comprises two rotary driven, adjacent and substantially vertically disposed, flexible shrimp-deshelling disc members.

4. The combination of claim 1, wherein said mechanical shrimp-deshelling means comprises a supply of water in which said shrimp is disposed during deshelling.

5. Apparatus for deshelling shrimp comprising two rotary driven, adjacent and substantially vertically disposed, flexible shrimp-deshelling members; means separating said disc members, disposed adjacent the top thereof, and providing a V-shaped opening into which shrimp may be delivered for deshelling; means contacting the outer surface portions of said discs along two parallel lines and urging the inner surfaces of said two discs into contact and forming the closed portion of said V-shaped shrimp-deshelling throat, and a cross shaft mounting said last-mentioned means.

6. The combination of claim 5, wherein said cross shaft is mounted parallel to the axis of said disc members, and the means separating said disc members are pivotally mounted on said cross shaft.

7. The combination of claim 6, wherein each of said means separating said disc members is supported by a means having universal movement and the latter is mounted on said cross shaft.

8. The combination of claim 5, wherein said cross shaft is mounted parallel to the axis of said disc members, and the means contacting the outer surfaces of said discs are pivotally mounted on said cross shaft.

9. The combination of claim 8, wherein each of the means contacting the outer surfaces of said discs is supported by a means having universal movement and the latter is mounted on said cross shaft.

10. The combination of claim 5 wherein a supply of water is furnished to said V-shaped deshelling throat forming a water reservoir therein.

References Cited

UNITED STATES PATENTS

| | | | |
|---|---|---|---|
| 2,034,691 | 3/1936 | Bottker et al. | 17—2 |
| 2,644,980 | 7/1953 | McKinstry | 17—2 |
| 2,853,733 | 9/1958 | Greiner | 17—2 |

LUCIE H. LAUDENSLAGER, Primary Examiner

U.S. Cl. X.R.

17—48